United States Patent [19]

Taniguti et al.

[11] Patent Number: 4,800,278
[45] Date of Patent: Jan. 24, 1989

[54] PYROELECTRIC INFRARED SENSOR

[75] Inventors: Yoshiharu Taniguti; Shigeki Edano; Kazuhiko Tanaka; Shiniti Taniguti; Megumi Kuramoto, all of Tottori, Japan

[73] Assignee: Nippon Ceramic Co., Ltd., Tottori, Japan

[21] Appl. No.: 928,248

[22] PCT Filed: May 30, 1986

[86] PCT No.: PCT/JP86/00275
§ 371 Date: Oct. 17, 1986
§ 102(e) Date: Oct. 17, 1986

[87] PCT Pub. No.: WO86/07449
PCT Pub. Date: Dec. 18, 1986

[30] Foreign Application Priority Data

| Jun. 6, 1985 [JP] | Japan | 60-123695 |
| Jun. 6, 1985 [JP] | Japan | 60-123696 |
| Jul. 10, 1985 [JP] | Japan | 60-106009 |
| Jul. 11, 1985 [JP] | Japan | 60-153585 |
| May 7, 1986 [JP] | Japan | 61-105200 |
| May 23, 1986 [JP] | Japan | 61-119831 |

[51] Int. Cl.⁴ .............. G01J 5/04; G01J 5/08; G01J 5/10
[52] U.S. Cl. ................ 250/338.1; 250/338.3; 250/349; 250/353
[58] Field of Search ........ 250/338 PY, 349, 342, 250/353, 338 R

[56] References Cited

U.S. PATENT DOCUMENTS

| 3,539,803 | 11/1970 | Beerman | 250/338 PY |
| 3,839,640 | 10/1974 | Rossin | 250/342 |
| 3,877,308 | 4/1975 | Taylor | 250/338.3 |
| 4,214,165 | 7/1980 | Asawa | 250/340 |
| 4,218,620 | 8/1980 | Oettel | 250/338 PY |
| 4,284,888 | 8/1981 | Appleby | 250/338 PY |
| 4,302,674 | 11/1981 | Adachi et al. | 250/342 |
| 4,322,124 | 3/1982 | Padgitt et al. | 250/338 |
| 4,384,207 | 5/1983 | Doctor | 250/349 |
| 4,437,002 | 3/1984 | Taniguchi et al. | 250/338.3 |
| 4,626,687 | 12/1986 | Nara et al. | 250/338.3 |

FOREIGN PATENT DOCUMENTS

| 15278 | 5/1972 | Japan . | |
| 998 | 1/1979 | Japan | 250/338.3 |
| 56-27640 | 3/1981 | Japan . | |
| 164430 | 10/1982 | Japan . | |
| 216976 | 12/1983 | Japan | 250/338.3 |

Primary Examiner—Carolyn E. Fields
Attorney, Agent, or Firm—Bogucki, Scherlacher, Mok & Roth

[57] ABSTRACT

External noise in an infrared sensor for a ceiling type human detector is suppressed by increasing the conductivity between a conductive window and the can and improving the temperature compensation by offsetting any difference in the electromotive force per unit area of the inside and/or outside electrode of the sensitive element consisting of coaxial electrodes with different areas. In a pair of electrodes for ceiling mounting the electromotive force is larger than in a pair of lower electrodes for floor mounting. The sensor improves a total sensitivity for use in the infrared sensor for a wall installation type human detector, on account of improving performance and reliability of the pyroelectric infrared sensor for use as a human detector.

12 Claims, 6 Drawing Sheets

PYROELECTRIC INFRARED SENSOR

BACKGROUND OF THE INVENTION

1. Field of the Invention

The present invention relates generally to a Pyroelectric Infrared Sensor (hereinafter described as an infrared sensor). More particularly, this invention relates to several undermentioned improvements and developments of the adhesion between a can and window material, the adjustment of the electromotive force from the sensing elements, the dimensions and the electric connection of the sensing elements, the adaptability among the sensing elements and other peripheral components or parts, and the supplemented optical material for use mainly in an intrusion alarm system.

2. Description of Relevant Art

Generally in many known infrared sensors, a window material such as Si, Ge or $Al_2O_3$, etc., is adhered to a can. The window material is able to transmit infrared energy and has a conductivity that results either from an inherent characteristic of the material itself or from appendant processing. Further such window material must be adhered to a can in the conductive state.

It is well known that sensing elements having a concentric-circle shape are most suitable for infrared sensors which are mounted and installed on higher portions such as the ceiling, etc., and that plural sensing elements for each identical sensing electrode area are preferred for the above-mentioned applications.

It is apparent that placement of a pair of sensing electrodes on a substrate is an efficient production process. It is also desirable that a pair of sensing elements and their peripheral components be symmetrically matched with another pair of sensing elements having similar characteristics. In addition, it is also well known that a costly crescent-shaped negative-meniscus lens, with antireflection coating, consisting of SiO may be assembled or mounted on the infrared sensor in the manufacturing process.

However, the previously known adhesion of a point only between a can and a window using conductive adhesives has some defects resulting from the incomplete conductive adhesion as well as from the non-hermeticity of the seal between the can and the window. Also, infrared sensors for upper or higher portion installation having sensing elements with concentric circle shapes and identical sensing electrode areas, have a serious fault in that they give a false alarm signal dependent upon a change of the ambient temperature, due to the impossibility of perfect temperature compensation.

The infrared sensor includes a can containing two pairs of sensing elements comprising the essential material and having identical characteristics, and peripheral components. The peripheral components can get separate signals from each pair of sensing elements, but even if these independent signals were processed through AND circuitry, false alarms caused by synchronous White Noise or Spike Noise from each sensing element would not be avoidable. And further, conventional infrared sensors having a costly optical member for condensing or adjustment of the optical beam are extremely wasteful because of component failures and poor production yields.

The present invention is intended to improve the reliability and the sensitivity of a wall mounted infrared sensor for an intrusion alarm system.

SUMMARY OF THE INVENTION

The present invention provides an infrared sensor particularly adapted for use in an intrusion alarm system, which introduces an improvement of the characteristics and reliability of prior sensors and which has wider application.

An infrared sensor in accordance with the present invention incorporates the improvement and development of conductive adhesion between a can and a window, the adjustment of the electromotive force as per a unit of the sensing electrode area for a high position installed sensor, the accomplishment of more complete temperature compensation, and further, the avoidance of synchronous white noise and spike noise generated in response to environmental changes, and assembling peripheral components for each pair of sensing elements with different characteristics. Additionally, this invention designs the optical member to adjust the condensing and the diffusing of optical beams. The invention comprises a low cost material of a high molecule substance, which is disposed on a substrate in concentric circles and which rectifies the incident light reaching the inside and outside sensing elements. The invention regulates the field of view and reduces the cost of infrared sensors.

BRIEF DESCRIPTION OF THE DRAWINGS

FIG. 1 shows an example of two high polymer optical members $O_1$, and $O_2$ which are installed in front of a window 1 having optical filter characteristics Conductive adhesive is applied inside of a can 2 having an aperture for installation of a window on the top.

Further, FIG. 1 shows the representative substrates which should be put into a can for two kinds of sensing elements on which sensing electrodes are placed. A substrate 3c having concentric-circle-shaped sensing elements which should be mounted at a high position and substrates $3P_1$, $3P_2$ each of which consists of one or two pieces of substrate(s) and has two sets of a pair of sensing elements. FIG. 1 also shows other electronic components 4 other than the elements (only a part of FET, a resistor, a condenser, IC and so on) and a header 5 for mounting the said elements. FIG. 1 further shows the model of a sensing element 6 by a longitudinal sectioral view in order to make the description clearer. It is shown in FIG. 1 that the sensing element 6 has a front electrode 61 on the surface of a substrate 3 consisting of pyroelectric material and a back electrode 62 on the opposite side or the back of the substrate.

The sensing element consists of two opposite electrodes on a front and a back surface of a substrate, and it is usual to provide an integrated lead electrode in the above electrodes in order to electrically connect the element to the fixed place. However the model is not shown in detail in the drawings because it is not necessary in view of the content of the present invention.

FIGS. 3b and 3c respectively show a two-point adhesion method and an all circle adhesion method of a can 2 and a window 1 by using conductive adhesive according to the present invention.

FIGS. 4a and 4b show two sensing electrodes 611 and 612 which are concentrically placed onto a substrate 3.

Referring to FIG. 4b, there is shown a nonelectrode area 41, which is not polarized, inside of a sensing electrode 612.

On the other hand, there is respectively shown in FIGS. 5a, 5b, 5c, and 5e each substrate for a wall mounted type sensor, not for putting on high place, and an illustration how to place the sensing electrodes onto each of them.

Referring to FIG. 5a, quarter circle shaped sensing electrodes 511, 512, 521 and 522 are placed on a piece of substrate 3 consisting of pyroelectric material, and as shown in FIGS. 6c and 6d, wires of the sensing electrodes are independently connected to FET-1 and FET-2 in series opposite polarity relationship and in parallel opposite polarity relationship. In FIGS. 5b, 5c, 5d and 5e four square sensing electrodes are placed on one substrate 3 and the numerals of corresponding electrodes are the same as in FIG. 5a.

FIG. 5c shows electric the connection of four pieces of sensing electrode. One pair consists of two pieces of sensing electrode which are placed across in odd number order from the left and the even-numbered electrodes form another pair, and they are connected in parallel opposite or series opposite polarity relationship.

FIG. 5d shows two pieces of divided substrate 3a and 3b on which each pair of sensing electrodes is placed.

FIG. 5e shows sensing elements in which the sensing electrodes of the upper side differ from those of the lower side in size.

It is possible to include an IC in a can as indicated by dotted lines if necessary, however, the can is omitted in FIG. 6.

In FIG. 11a, the concave lens 102 made from high polymer resin is installed at the top of the can 2 of a finished infrared sensor, and in FIG. 11b the above said lens 102 is installed between a filter 1 and sensing element 6. Further if FIG. 11c, a fresnel lens 102 which has the same function as the said lens 102 of FIG. 11b is installed between a filter 1 and a sensing element 6.

DETAILED DESCRIPTION OF THE INVENTION

The present invention aims at decreasing the cost and widening usage by means of a new adhesion method of windows and can, a new adjustment method of electromotive force efficiency per unit area of sensing elements which have sensing electrodes in the shape of concentric circles on one substrate, and different electric conjunction methods obtained by altering areas of a sensing electrode for each pair of two sensing elements. Furthermore there is taught a new construction method of placing electric components inside the can in the infrared sensor which produces plural signals generated by plural sensing elements, which are put in a can, through prescribed connected wires, and at the same time a new combination of production-effective optical components and the infrared sensor.

Figure 1:
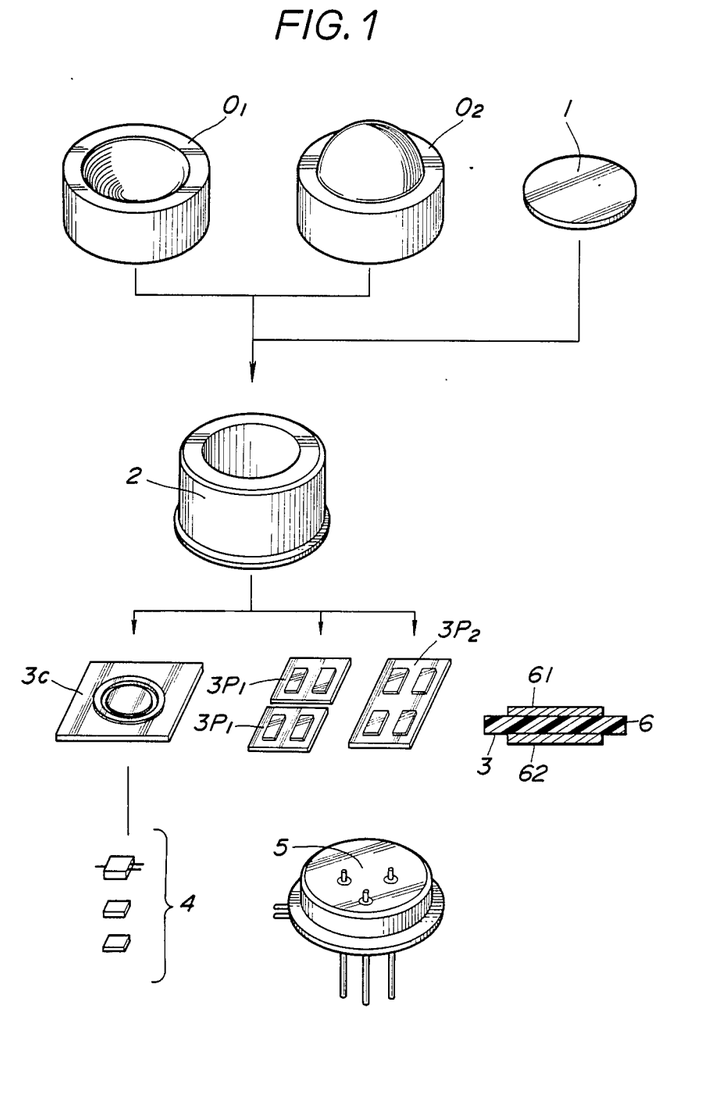
FIG. 1 is a perspective view of the respective components composing the infrared sensor which embodies the present invention.
Figure 2:
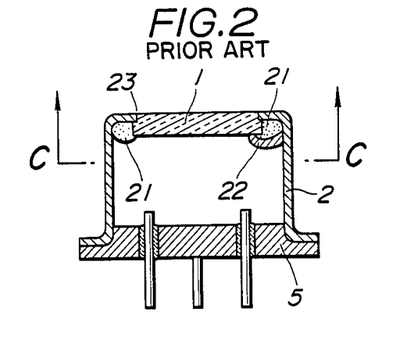
FIG. 2 is a longitudinal sectional view showing the adhesion conditions by a conventional method between a can 2 and a window 1.

To clearly systematize organization of the present invention, a perspective view is shown in FIG. 1.

Firstly, for the purpose of broadening applications and improving performance of the infrared sensor, optical components $O_1$ and $O_2$, which are designed for wide angle or condensed light direction adjustment shall be mentioned, and then the adhesion method between window and can which is particularly important for making can 2 with a window 1 including sensing elements of the infrared sensor shall be mentioned.

A sensing element has sensing electrodes on a substrate $3c$. Sensing elements which have at least two pairs of sensing electrodes on one substrate or electric components 4 shall be mentioned hereafter.

A base 5 carrying electric components does not have special meaning in the present invention, however, since it is an integral part of the invention, it is shown in FIG. 1.

To make the terms used in these sentences clear, the construction of a sensing element 6 which consists of the front electrode 61, the back electrode 62, and the substrate $3c$ or $3p_1$, $3p_2$ is shown in FIG. 1 by the vertical cross-section view as an example.

Since the term sensing electrode represents the portion of a sensor where the front electrode and the back electrode face each other with a substrate between, the portion of a sensor where a part of the front electrode or the back electrode is continuously extended to provide a lead terminal is not referred as the sensing electrode.

The introduction is finished here, and the details of the present invention shall follow hereafter, referring to the figures in order.

Figure 3A:
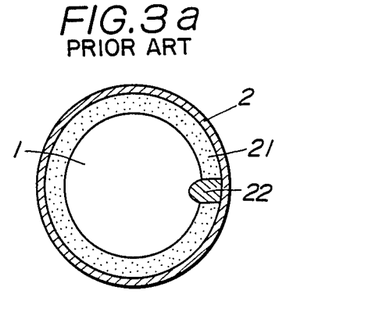
FIG. 3a, FIG. 3b and FIG. 3c are plan views, being seen from the bottom of view taken vertically to the sheet along the line cc of FIG. 2.
Figure 3B:
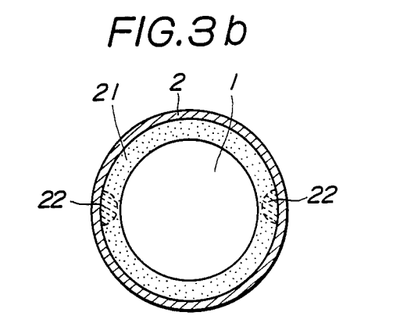
Figure 3C:
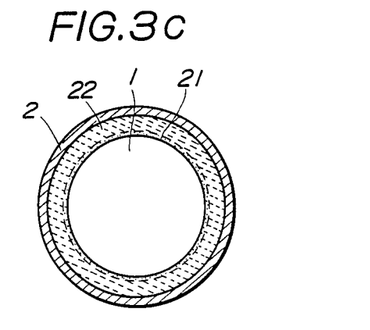
Figure 4A:
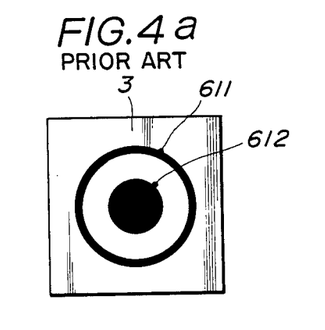
FIG. 4a is a top plan view of a sensing electrode of a concentric-circle-shaped sensing element of a conventional infrared sensor which shall be installed at a high place.
Figure 4B:
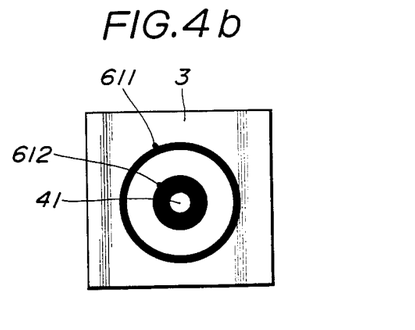
FIG. 4b shows a top plan view of an illustration of a concentric circle-shaped sensing electrode according to the present invention.

The conventional construction, as seen in application disclosure 56-27640 of Japan Utility model, is such that the conductive adhesive 19 is used to connect a window surface 17 to a can 15 after adhesion of a window 17 onto a can 15 using non-conductive adhesive 18. However, the window surface has high insulation resistance value because optical coating strata is foamed on it to function as a filter. Therefore, there is a defect in that the conventional infrared sensors cannot cut off noise caused by radio waves which come from the outside since electric contact resistance between the window surface and can is high (for example, silicon window, of which characteristics are $6.5\mu$ cut-on-bandpass $14\mu$, has $10^{12} \Omega$ resistance). It is desirable that the uncoated portion of the window substrate and a portion of the can to be connected to each other directly and held together. However, there is considerable difficulty in firmly connecting a fragile Si or Ge window to the can. As presented in the present invention, perfect interception of outside noise has met one of the conditions to enhance the reliability as an infrared sensor by controlling the electric connection resistance value between the can and window at less than 500k ohm by means of application of the conductive adhesive 22 on to the outer circle or periphery of the window 23 where an optical coating is not applied. The conductive adhesive can be applied on to two portions as shown in FIG. $3b$, and further on to the total outer circle as shown in FIG. $3c$.

Further, epoxy resin 21 might be used after hardening of the conductive adhesive 22 in some cases to reinforce mechanical adhesion strength between the can and window.

Figures 5A, 5B, 5C, 5D, 5E:
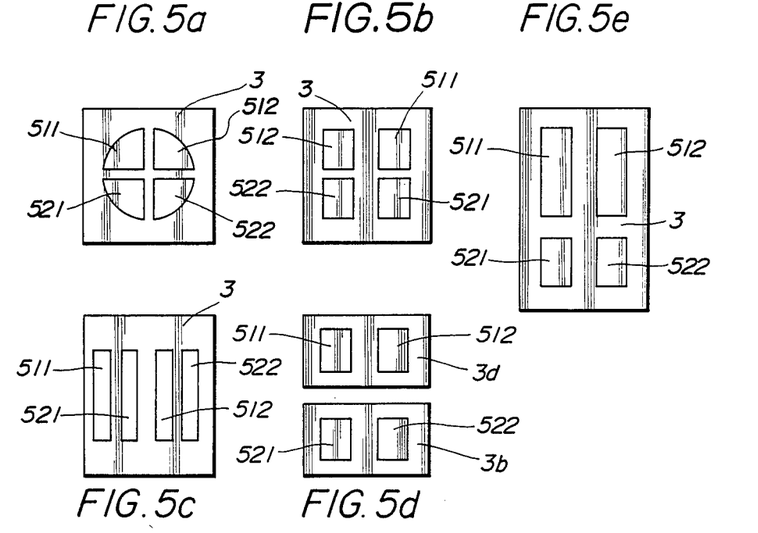
Figure 6A:
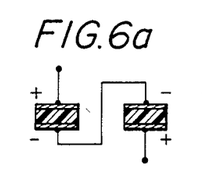
FIGS. 6a and 6b show the basic electric connection of the sensing electrodes in series opposite polarity and parallel opposite polarity relationship. Further
Figure 6B:
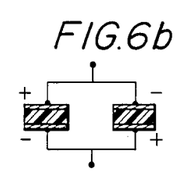
Figure 6C:
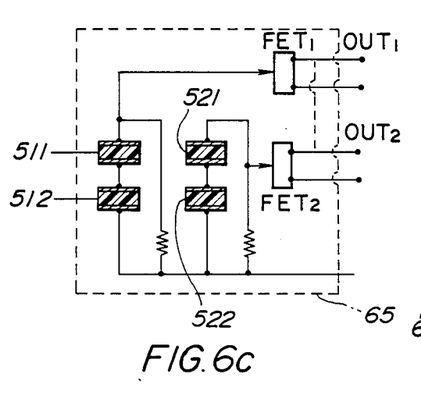
FIGS. 6c and 6d show the typical electric connection of an infrared sensor in respect to the present invention. They show the sensing elements 511, 512, 521 and 522 and other electronic components such as resistors and FET transistors.
Figure 6D:
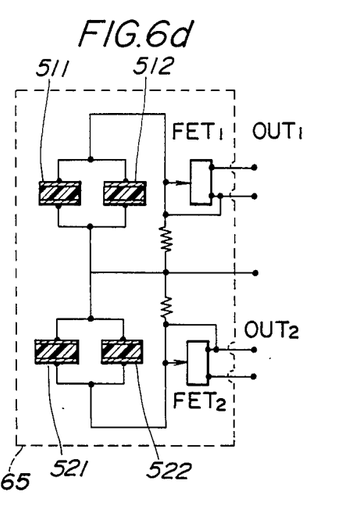

As shown in FIG. 5, two sensing elements 511, 521 or 512, 522 form one pair and the two pairs are composed on one or more substrates 3, $3d$ $3b$ whereby the reliability as an infrared sensor for human body detection can particularly be enhanced. Those electric elements are connected to separate FETs per the pair in series opposite polarity relationship as shown in FIG. $6a$ or parallel opposite relationship as shown in FIG. $6b$.

The combination of one pair of sensing elements connected in parallel opposite polarity relationship and another pair of sensing elements connected in series opposite relationship is placed in one can. Furthermore, the properties of each element comprising one pair are preferred to be equivalent. However, it is desirable that the properties of the elements differ from one another such as by their element sizes being different in some cases.

Figure 9:
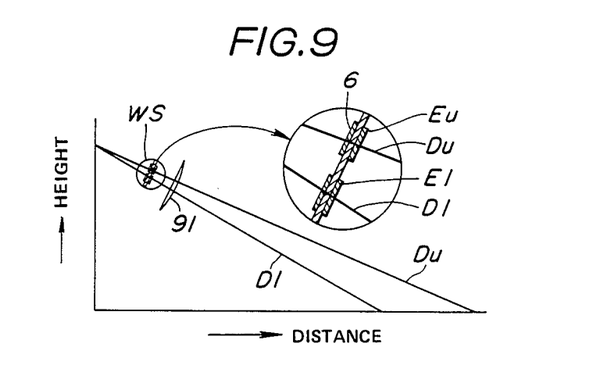
FIG. 9 is a model view showing the sensing distance Du of a sensing element Eu and a sensing distance Dl of a sensing element El in a wall mount type sensor Ws having a lens 91. The sensing element Eu consists of the front sensing electrode 511 (512) and the sensing element El consists of the back sensing electrode 521 (522), a part of which is enlarged in a circle.

For example, in a unit mounted low on a wall to detect human presence, one pair of sensing elements 6 in a unit comprises one pair of the two pairs of sensing elements $E_u$, $E_1$ and is located in the can below the other pair to cover a shorter (narrower) range than the other pair of elements which are mounted above the shorter range pair of elements. Both pairs receive radiation through the same lens 91 or mirror. The sensitivity of the lower placed pair of sensing elements can be lower than that of upper placed pair of sensing elements as shown in FIG. 9 where an infrared sensor is used for wall type human detection.

In other words, the size of the upper placed pair of sensing elements can be bigger than the size of the lower placed pair as shown in FIG. $5e$. The size selection is designed to satisfy the sensitivity requirement that the size be proportional to each sensing distance $D_U$, $D_1$ of the pairs of upper and lower placed sensing elements in order to effectively divide the area on the limited substrate 3.

Figure 7:
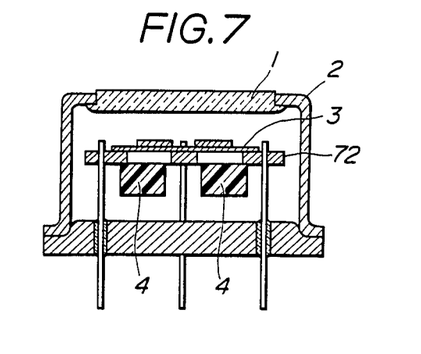
FIG. 7 is a longitudinal sectional view showing an illustration of an assembled infrared sensor having four pieces of sensing elements with respect to the present invention, in which a holder 72 mounting the said substrate 3, a resistor (not shown in drawings), an FET and other electronic components 4 on a header are placed on the holder 72 and the holder 72 is covered with a can 2 with a window on its head which has a sealing function.

It is one of the main factors of the present invention that each pair of components of an infrared sensor having plural pairs of sensing elements has independent output terminals and that the different pairs possess different properties from each other. A vertical cross-section of an infrared sensor comprising two pairs of sensing elements is shown in FIG. 7 as an example. If all of the electric components which are connected to each pair of the elements have the same properties, spike noises which arise at very low frequency ought to arise from independent output terminals simultaneously, wherefore it becomes impossible to prevent false alarms owing to spike noise by using an AND circuit. Thus it becomes impossible to produce highly reliable human body detection equipment with identical pairs of component.

Figure 8:
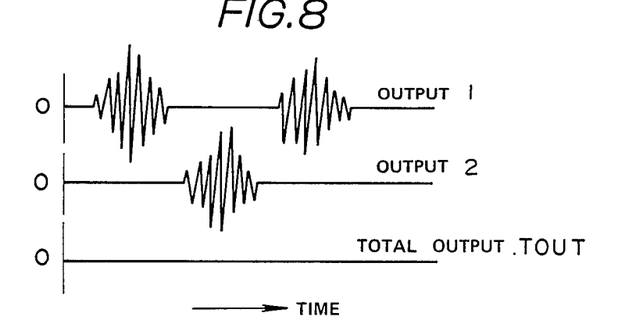
FIG. 8 shows output characteristic of noise signals and the line that result when the said infrared sensor is put in an environment.

If different properties are given to the electric components of each different pair in accordance with a characteristic of the present invention, then because of the differences between components, output 1 has a tendency to produce spike noises in the summer season when the temperature is high and output 2 has a tendency to produce spike noises in the winter season when the temperature is low. Spike noises do not therefore arise simultaneously at the two output terminals, as shown in FIG. 8. Therefore the total output (Tout) which is generated after the two noise signals are passed through an AND circuit will never produce false alarms. The present invention is thus able to supply highly reliable infrared sensors for human body detectors.

If the electromotive efficiencies per unit area of sensing element of concentric circle shaped sensing electrodes 611, 612 on a substrate 3 made from pyroelectric material for mounting in high places are equivalent, the outer electrode 611 and the inner electrode 612 ought to 30 offset pyroelectric output from each other which arises due to temperature change when connected in parallel opposite relationship or series opposite relationship as shown in FIG. 6a and FIG. 6b.

Figure 10A:
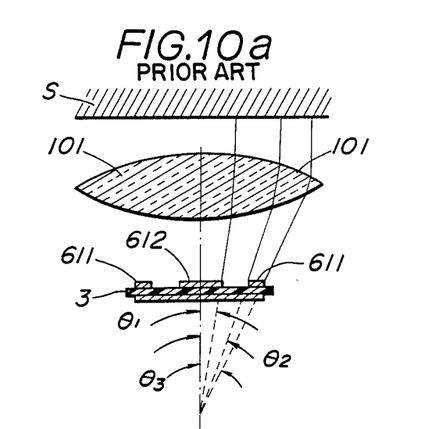
FIG. 10a is a model view showing how a concentric shaped sensing electrodes 611 and 612 on a substrate detect energy condensed by an optical lens 101 with respect to the conventional infrared sensor when infrared energy is radiated from an infrared radiator S.

However, in fact, infrared radiation having a vertical incident angle against the surface of the sensitive electrode cannot be received, as when the converging lens 101 or some mirror is placed between a radiant source S of the infrared energy and sensitive electrodes 611, 612 as shown by the component parts in FIG. 10a.

The infrared energy through the lens is directed toward the focus of the converging lens, and reaches to the fat substrate 3 having the sensitive electrode.

In this case, the angle of incidence upon the sensor increases from zero at the center axis to a significant angle at the outside. The incident angles $\theta_1$, $\theta_2$, $\theta_3$ are increased accordingly to from the center axis of the lens to the outside.

As a result, since the effective energy Ee is $Ee \propto EI\cos\theta$, (E:Emissivity Factor, I:Intensity of Input Energy), and $\theta_1$ in the center part of the sensitive electrode is smaller, the effective sensitive energy at the center is larger that at the outside near the wall of the can.

Because of the above, the pyroelectric performance depends upon the absorbed infrared energy. If the outer and inner sensitive elements each have the same area they cannot generate equal electromotive forces by receiving incident infrared energy through the lens from the outside.

That is to say, the effective sensitive energy which the center sensitive electrode 612 receives is $$Ee(\theta \leq 10°) = EI\cos 10° \text{ assuming as } \theta_1 \leq 10,$$

and, the effective energy which the outer sensitive electrode 611 receives $Ee(\theta=50°)=EI\cos 50$ regarding as $\theta=50°$. The ratio of received effective energy is $$Ee(\theta \leq 10°)/Ee(\theta \leq 50° = \cos 10°/\cos 50° = 1.53).$$

In other words, if a mean angle of an incident ray into the inside electrode is $\theta=\theta_1/2=10°$ as approximately shown in FIG. 10a, and a mean angle of an incident ray into the outside electrode is $\theta=(\theta_2+\theta_3)/2=50$, the electromotive force per a unit of area of the inside sensitive electrode is effectively 1.53 times that of the outside electrode.

As a result, in order that the outside sensitive element and the inside sensitive element cancel each other for those outputs generated by temperature drift, it is necessary to use a reflective paint to change the emissivity E, or to make the area of inside sensitive electrode smaller than the area of the outside electrode, or to make large the state of radiant heat, so that the efficiency of the electromotive force per a unit area of the inside sensitive element may be lower than the efficiency of the electromotive force per a unit area of the outside sensitive element.

Figure 10B:
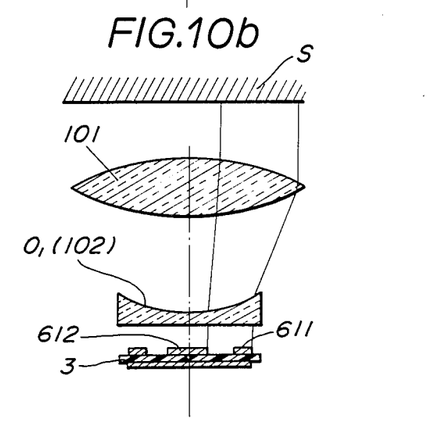
FIG. 10b is an optical model view in which a condensing lens 101 is put on an optical course between the infrared radiator S and a sensing electrode, and then a concave lens 10 made from a high polymer resin by which the present invention is characterized is placed on the optical course between the condensing lens 101 and a sensing electrode.

Moreover, as shown in FIG. 10b based on the same idea as the above-mentioned, it is possible to correct the incident angle onto the inside and/or outside sensitive electrode by placing the converging lens 101 or some mirror in the path of the radiant energy from the source of the infrared radiation, S.

Figure 11A:
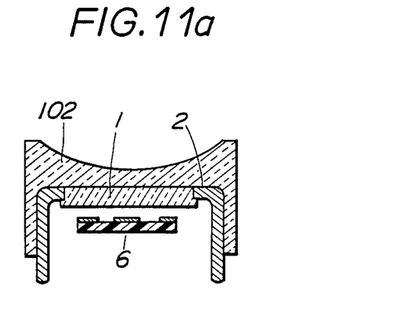
FIGS. 11a, 11b and 11c show the same examples of installing the concave lens of a fresnel lens which has the equivalent function to the infrared sensor by a longitudinal sectional view corresponding to the related past materials.
Figure 11B:
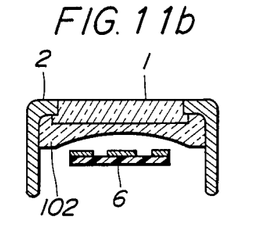
Figure 11C:
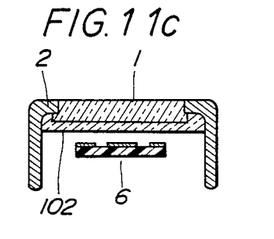

In this embodiment, a balancing of the electromotive forces generated from the aforesaid inside and/or outside sensitive element can be achieved by providing a plano-concave lens made of the same polymeric resin as the optical material $O_1$ (102) on the front surface of the sensitive element 6, as shown in the cross section FIGS. 11a, b, c.

After manufacturing a novel infrared sensor by bonding the plano-concave lens made of the polymeric resin onto the outside of the can 2, as shown in FIG. 11a, it is desirable to be able to adjust the corrective optical material $O_1$ to change the converging performance of the converging lens.

In FIG. 11b, there is also shown an improvement in a binding function of the window 1 and the can 2 which results from an inner pressure from the inside of the optical material $O_1$. As shown in FIG. 11c, in case of using Fresnel's plano-concave lens, it is possible for the gap or space to narrow between the sensitive element 6 and the window 1.

An infrared sensor used with a crescent, planoconcave lens 121 made of a polymeric resin according to the invention is quite different in structure, is very economical, and is easy to make. SiO is used as the optical material and the substrate may be the same as that which is used for conventional near infrared rays, as shown in a typical example in FIG. 12a in a vertical cross section view.

Furthermore, by using the crescent shaped, plano-concave lens made of polymer resin, a sensor for a far infrared ray could be made. Such a sensor would have a field of view of 180° solid angle onto a front surface by mounting the given components 3, 122, 123 onto a header 5 as in a conventional infrared sensor and then covering and welding the can 2 having the window 1 to the header 5 as shown in vertical cross section in FIG. 12a.

The wavelength band which the conventional near infrared sensor shown in U.S. Pat. No. 4,322,124 has intended is 2.4$\mu$ to 3.0$\mu$ (microns). The structure is quite different mechanically from the 6.5$\mu$~9.5$\mu$ band of the sensor intended for this present invention, on account of the difference in the energy level of the incident infrared radiation.

For one example, the mean wavelength of the range 2.4$\mu$ and 3.0$\mu$ of the conventional infrared sensor is increased to 2.7$\mu$ in order to easily estimate the mean value though it is not the center value of the energy level and the mean wavelength in the present example is (6.5$\mu$+9.5$\mu$)/2=8$\mu$. If the source radiation for the two sensors is the same, then the ratio of the energy levels of the two sensors is proportional to the absolute temperature to the 4th power corresponding to its wavelength, $(1.073)^4/(362)^4=77$. In other words, an infrared sensor having a conventional structure is intended to sense a source radiation 77 times stronger than that needed for a sensor according to the present invention and cannot sense small (ratio of the energy level is mere 1/77 or 1.3% of the convention's) radiation levels as intended in this present invention.

Figure 12:
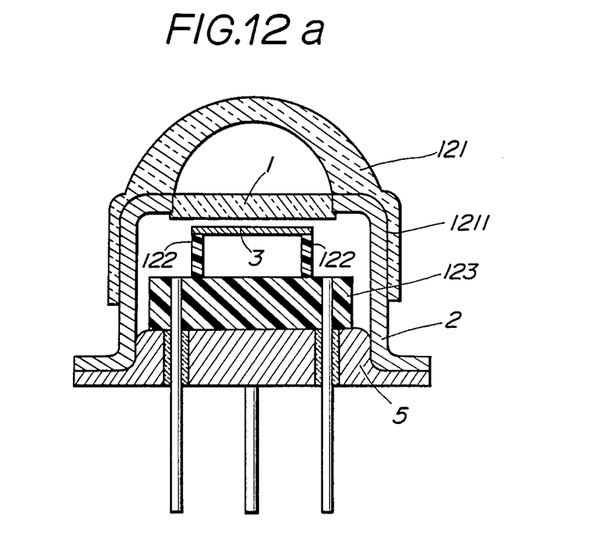
FIG. 12a shows by a longitudinal sectional view an illustration of the infrared sensor on which an optical material 121 is placed over the optical element. The optical material has as setting part 1211 made from high polymer resin and has the function of condensing incident radiation to provide a wide angle. The sensor consists of the above said materials plus a substrate 3 having a sensing element, a holder 1 supporting sensors 3a and 3b and block 123 on which mount other electronic components than the sensing elements.
FIG. 12b is a longitudinal sectional view of the conventional near-infrared sensor in which a wide-angle condensing lens 121 made from SiO is supported only by a supporter 124 and a sensing element 125 is placed on the back of an optical filter 126. However it is clear that the structure is totally vulnerable against external noise signals and since the sensing target is different from that of the far-infrared sensor of the present invention, the results are inferior.

The definite difference between the infrared sensor in this present invention and the conventional sensor is that the structure in this present invention is perfectly shielded by the metal header 5 on the back surface, by the can 2 on the side wall of the can, and in the top of the can by the window 1 of the semiconductive substrate like a silicon or germanium, as shown in FIG. 12a. Moreover, the infrared sensor in this present invention has the optical material 01 which is removable additionally on its head.

Meanwhile, the structure of the conventional sensor has no means to shield against the external noise, as shown in FIG. 12b.

The reason for the above is that the conventional sensor is not influenced by the external noise on account of sensing strong radiation of the infrared energy. The present sensor has much more sensitive performance in order to sense small levels of infrared energy. It is also more sensitive against external noise so the structure with the perfect shield is required.

For these reasons, the idea of the design in this present invention is basically different.

Due to the present invention, it is possible to make a more sensitive and more reliable infrared sensor for the far infrared band, and above all for use as a human detector. Also, this invention has many industrial applications in diverse fields.

We claim:

1. An infrared sensor comprising a housing enclosing an infrared sensitive element, said housing having an opening at one end and a conductive window having a peripheral edge, the window being secured to the housing and covering the opening, a conductive adhesive disposed between the peripheral edge of the window and the housing in a plurality of locations for providing a conductive path between the window and the housing for reducing contact resistance therebetween;

said infrared sensitive element including a substrate having a surface;

concentric inner and outer electrodes formed on the surface of the substrate;

a plano-concave converging lens disposed in opposed relationship to the substrate and to the inner and outer electrodes, said lens positioned for receiving incident infrared rays passing through said window and directing the rays onto said inner and outer electrodes in a direction substantially perpendicular to the surface of said substrate.

2. An infrared sensor according to claim 1 wherein the window comprises a polymeric resin.

3. An infrared sensor comprising:

at least one substrate having a surface;

first and second infrared radiation sensing elements disposed on the surface of the at least one substrate, each sensing element including at least one pair of electrode pairs connected in opposite polarity relationship with each electrode pair having concentric inner and outer electrodes;

a can encapsulating the at least one substrate;

a conductive window secured to the can by a conductive adhesive engaging a conductive edge of the window to pass incident infrared radiation to the radiation sensing elements; and a plurality of terminals providing independent electrical outputs from the first and second infrared radiation sensing elements.

4. An infrared sensor according to claim 3 comprising at least two substrates, each having a radiation sensing element on the surfaces thereof.

5. An infrared sensor according to claim 4 wherein an area enclosed by each pair of electrodes of the first radiation sensing element is greater than an area enclosed by each pair of electrodes of the second radiation sensing element.

6. An infrared sensor according to claim 4 wherein the first infrared radiation sensing element includes at least two electrode pairs connected in series opposite polarity relationship and the second infrared radiation sensing element include at least two electrode pairs connected in parallel opposite polarity relationship.

7. An infrared sensor according to claim 4 wherein the electrode pairs of each radiation sensing element are connected in series opposite polarity relationship.

8. An infrared sensor according to claim 4 wherein the electrode pairs of each radiation sensing element are connected in parallel opposite polarity relationship.

9. An infrared sensor according to claim 4 wherein the window comprises a polymeric resin.

10. An infrared sensor comprising:

an infrared radiation sensing element;

a can enclosing the infrared radiation sensing element, the can having an opening at one end thereof;

a conductive window transparent to infrared radiation sealingly secured to the can and covering the opening for passing infrared radiation to the infrared radiation sensing element, said window having opposing faces and a conductive peripheral edge defined between said faces; and a conductive adhesive engaging the window along the conductive peripheral edge thereof and the can in at least two locations for providing low electrical resistance between the window and the can for improving the shielding efficiency of the infrared sensor.

11. An infrared sensor according to claim 10 wherein said sensing element includes a substrate having a surface on which concentric inner and outer electrodes are formed, an electromotive force per unit area of said outer electrode being greater than that of said inner electrode so as to be balanced therebetween.

12. An infrared sensor according to claim 10 wherein the conductive adhesive provides a low electrical resistance between the window and can of no greater than about $5 \times 10^5$ ohms.

* * * * *

UNITED STATES PATENT AND TRADEMARK OFFICE
CERTIFICATE OF CORRECTION

PATENT NO. : 4,800,278
DATED : Jan. 24, 1989
INVENTOR(S) : Taniguti et al.

It is certified that error appears in the above-identified patent and that said Letters Patent is hereby corrected as shown below:

Column 2, line 34, after "characteristics" and before "Conductive" insert --. -- (period).

Column 2, lines 48/49, "sectioral" should read --sectional--.

Column 4, line 24, "if" should read --in--.

Column 6, line 67, "30" should be deleted.

Column 7, line 11, "fat" should read --flat--.

Column 7, line 21, "that" should read --than--.

Signed and Sealed this

Sixteenth Day of January, 1990

Attest:

JEFFREY M. SAMUELS

Attesting Officer     Acting Commissioner of Patents and Trademarks